US007730967B2

(12) United States Patent
Ballantyne et al.

(10) Patent No.: US 7,730,967 B2
(45) Date of Patent: Jun. 8, 2010

(54) DRILLING WELLBORES WITH OPTIMAL PHYSICAL DRILL STRING CONDITIONS

(75) Inventors: Ray Ballantyne, Houston, TX (US); Holger Mathiszik, Wathlingen (DE); Michael Neubert, Braunschweig (DE)

(73) Assignee: Baker Hughes Incorporated, Houston, TX (US)

( * ) Notice: Subject to any disclaimer, the term of this patent is extended or adjusted under 35 U.S.C. 154(b) by 1405 days.

(21) Appl. No.: 10/873,091

(22) Filed: Jun. 22, 2004

(65) Prior Publication Data

US 2005/0279532 A1 Dec. 22, 2005

(51) Int. Cl.
*E21B 47/00* (2006.01)
(52) U.S. Cl. ........................................................ 175/40
(58) Field of Classification Search .................. 175/40, 175/24
See application file for complete search history.

(56) References Cited

U.S. PATENT DOCUMENTS

| | | | |
|---|---|---|---|
| 3,497,019 A | 2/1970 | Ortloff | |
| 3,831,138 A | 8/1974 | Rammner | |
| 4,430,892 A | 2/1984 | Owings | |
| 4,575,261 A | 3/1986 | Berger et al. | |
| 4,662,458 A | 5/1987 | Ho | |
| 4,695,957 A | 9/1987 | Peltier | |
| 4,739,841 A | 4/1988 | Das | |
| 4,761,889 A | 8/1988 | Cobern et al. | |
| 4,794,534 A | 12/1988 | Millheim | |
| 4,805,449 A | 2/1989 | Das | |
| 4,854,397 A | 8/1989 | Warren et al. | |
| 4,903,245 A | 2/1990 | Close et al. | |
| 4,956,921 A | 9/1990 | Coles | |

(Continued)

FOREIGN PATENT DOCUMENTS

DE 19941197 A1 9/1998

(Continued)

OTHER PUBLICATIONS

Jakob B.U. Haldorsen et al.; Feb. 2003; XP-002348988; Optimizing the Well Construction Process: Full-Waveform Data from While Drilling Seismic Measurements in the South Caspian Sea.

(Continued)

*Primary Examiner*—Hoang Dang
(74) *Attorney, Agent, or Firm*—Madan & Sriram, P.C.

(57) ABSTRACT

A drilling system includes a control unit and a bottomhole assembly (BHA) coupled to a drill string. The control unit uses measurements from sensors distributed throughout the drill string and BHA to determine the physical condition of the drill string and BHA and to determine whether drilling can be optimized. The drill string sensors are housed in receiver subs and optionally can be positioned on extensible members. The receiver sub also can include a short-hop telemetry module, a processor module, and a clock module. In one embodiment, the receiver subs include seismic sensors for enabling vertical seismic profiling. During operation, the processor visually presents to the operator via one or more graphical user interfaces a dynamically updated pictorial image representing the drilling system. The image is annotated with an appropriate visual signal to indicate a determined physical condition at a given location or component. The processor can also display recommended adjustments to drilling parameters for increasing drilling rates, improving tool life, and more precise steering.

24 Claims, 6 Drawing Sheets

U.S. PATENT DOCUMENTS

| | | | |
|---|---|---|---|
| 4,972,703 A | 11/1990 | Ho | |
| 5,064,006 A | 11/1991 | Waters et al. | |
| 5,160,925 A * | 11/1992 | Dailey et al. | 340/853.3 |
| 5,163,521 A | 11/1992 | Pustanyk et al. | |
| 5,230,387 A | 7/1993 | Waters et al. | |
| 5,250,806 A | 10/1993 | Rhein-Knudsen et al. | |
| 5,269,383 A | 12/1993 | Forrest | |
| 5,318,137 A | 6/1994 | Johnson et al. | |
| 5,332,048 A | 7/1994 | Underwood et al. | |
| 5,341,886 A | 8/1994 | Patton | |
| 5,353,873 A | 10/1994 | Cooke, Jr. | |
| 5,358,059 A | 10/1994 | Ho | |
| 5,390,748 A | 2/1995 | Goldman | |
| 5,394,951 A | 3/1995 | Pringle et al. | |
| 5,410,303 A | 4/1995 | Comeau et al. | |
| 5,419,505 A | 5/1995 | Yoshikawa | |
| 5,439,064 A | 8/1995 | Patton | |
| 5,467,832 A | 11/1995 | Orban et al. | |
| 5,473,158 A | 12/1995 | Holenka et al. | |
| 5,490,569 A | 2/1996 | Brotherton et al. | |
| 5,602,541 A | 2/1997 | Comeau et al. | |
| 5,678,643 A | 10/1997 | Robbins et al. | |
| 5,684,693 A | 11/1997 | Li | 364/422 |
| 5,753,812 A | 5/1998 | Aron et al. | 73/152.47 |
| 5,803,185 A | 9/1998 | Barr et al. | |
| 5,812,068 A | 9/1998 | Wisler et al. | |
| 5,877,996 A | 3/1999 | Krokstad et al. | 367/31 |
| 5,947,213 A | 9/1999 | Angle et al. | |
| 5,995,446 A | 11/1999 | Meyer et al. | |
| 6,012,015 A | 1/2000 | Tubel | |
| 6,021,377 A | 2/2000 | Dubinsky et al. | |
| 6,023,443 A | 2/2000 | Dubinski et al. | |
| 6,026,911 A | 2/2000 | Angle et al. | |
| 6,084,826 A | 7/2000 | Leggett, III | 367/82 |
| 6,101,445 A | 8/2000 | Alvarado et al. | 702/9 |
| 6,131,694 A | 10/2000 | Robbins et al. | 181/105 |
| 6,176,323 B1 * | 1/2001 | Weirich et al. | 175/40 |
| 6,206,108 B1 * | 3/2001 | MacDonald et al. | 175/24 |
| 6,216,533 B1 | 4/2001 | Woloson et al. | 73/152.47 |
| 6,272,916 B1 | 8/2001 | Taniguchi et al. | 73/152.47 |
| 6,382,331 B1 | 5/2002 | Pinckard | 175/27 |
| 6,405,136 B1 | 6/2002 | Li et al. | 702/10 |
| 6,408,953 B1 | 6/2002 | Goldman et al. | 175/39 |
| 6,424,595 B1 | 7/2002 | Chenin | 367/82 |
| 6,424,919 B1 | 7/2002 | Moran et al. | |
| 6,439,046 B1 | 8/2002 | Kruspe et al. | 73/152.01 |
| 6,446,009 B1 | 9/2002 | Baeten et al. | 702/17 |
| 6,446,718 B1 | 9/2002 | Barrett et al. | |
| 6,464,011 B2 | 10/2002 | Tubel | 166/313 |
| 6,760,665 B1 | 7/2004 | Francis | 702/6 |
| 7,400,262 B2 * | 7/2008 | Chemali et al. | 340/854.3 |
| 2002/0050989 A1 | 5/2002 | Sanstrom | |
| 2003/0074139 A1 | 4/2003 | Poedjono | |
| 2003/0205083 A1 | 11/2003 | Tubel | |
| 2003/0221869 A1 | 12/2003 | Ireland | 175/40 |
| 2005/0024231 A1 * | 2/2005 | Fincher et al. | 340/854.4 |
| 2005/0217896 A1 | 10/2005 | Terentyev et al. | |

FOREIGN PATENT DOCUMENTS

| | | |
|---|---|---|
| EP | 0595033 A2 | 5/1994 |
| EP | 0718641 A2 | 6/1996 |
| EP | 1126129 A1 | 8/2001 |
| GB | 2247477 A | 3/1992 |
| GB | 2340944 A | 3/2000 |
| GB | 2352046 A | 1/2001 |
| JP | 6346448 | 12/1994 |
| WO | WO9731175 | 8/1997 |
| WO | WO0050728 | 8/2000 |
| WO | WO0161140 A1 | 8/2001 |
| WO | WO0238915 A2 | 5/2002 |

OTHER PUBLICATIONS

G. Heisig et al., Downhole Diagnosis of Drilling Dynamics Data Provides New Level Drilling Process Control to Driller, SPE 49206, 1998 SPE Annual Technical Conference and Exhibition, New Orleans, Louisiana, Sep. 27-30, 1998, pp. 649-658.

M. Hutchinson et al., An MWD Downhole Assistant Driller, SPE 30523, XP 000618424, Annual Technical Conference and Exhibition, Dallas, Texas, Oct. 22-25, 1995, pp. 743-752.

XP 000644908, Drilling Issue, Well-site analysis headed for economy, new capabilities, The Oil and Gas Journal, Sep. 24, 1973, pp. 132, 134, 136 and 141.

D. Dashevskiy et al., Application of Neural Networks for Predictive Control in Drilling Dynamics, SPE 56442, 1999 SPE Annual Technical Conference and Exhibition, Houston, Texas, Oct. 3-6, 1999, pp. 3-8.

K.K. Millheim et al., An Engineering Simulator for Drilling: Part II, SPE 12210, 58th Annual Technical Conference and Exhibition, San Francisco, CA, Oct. 5-8, 1983, pp. 1-12.

J.D. Barr et al., Steerable Rotary Drilling With an Experimental System, SPE/IADC 29382, 1995 SPE/IADS Drilling Conference, Amsterdam, Feb. 26-Mar. 2, 1995, pp. 435-450.

* cited by examiner

DRILLING WELLBORES WITH OPTIMAL PHYSICAL DRILL STRING CONDITIONS

CROSS-REFERENCE TO RELATED APPLICATIONS

None.

FIELD OF THE INVENTION

This invention relates generally to oilfield wellbore drilling systems that utilize distributed measurements to optimize drilling. In another aspect, this invention relates to control devices that provide a pictorial display of the drilling system to convey information regarding the physical health of the system.

BACKGROUND OF THE ART

To obtain hydrocarbons such as oil and gas, boreholes are drilled by rotating a drill bit attached at a drill string end. A large proportion of the current drilling activity involves directional drilling, i.e., drilling deviated and horizontal boreholes, to increase the hydrocarbon production and/or to withdraw additional hydrocarbons from the earth's formations. Modern directional drilling systems generally employ a drill string having a bottomhole assembly (BHA) and a drill bit at end thereof that is rotated by a drill motor (mud motor) and/or the drill string. A steering assembly may be used to steer the BHA in a desired direction.

In many instances, the wellbore path or trajectory is designed to intersect a hydrocarbon reservoir in a manner that is expected to most effectively drain that reservoir. To execute such a path or trajectory, extensive information must be known as to the lithology of a formation and its geophysical characteristics. Some of this information is obtained during seismic prospecting operations. Also, logging operations can be done in a drilled well or offset well using formation evaluation tools to develop additional data regarding the formation of interest. More sophisticated BHA's are equipped with devices for measuring various formation parameters of interest. Such devices typically include sensors for measuring downhole temperature and pressure, azimuth and inclination measuring devices and a resistivity measuring device to determine the presence of hydrocarbons and water. This information, which is obtained during drilling, can be used to navigate toward, away or through a formation of interest (also known as "geosteering").

One operation for developing geological information useful for directional drilling is vertical seismic profiling (VSP). Vertical seismic profiling or "VSP" is a well known technique to obtain data on the characteristics of lithological formations. In one conventional VSP operation, drilling is paused and the drilling assembly is extracted from the wellbore. Thereafter, one or more seismic sources are positioned near the borehole at the surface and a sonde having one or more seismic detectors is lowered into the borehole on a wireline cable. The sonde is then positioned at a number of depths in the well while the sources are activated and seismic readings are taken. In another conventional arrangement, a seismic detector is provided on the bottomhole assembly. As the bottomhole assembly progresses into the formation, drilling is intermittently halted at selected depths so that the VSP survey can be performed. As can be seen, in both conventional arrangements, drilling activity can be interrupted for an extended period to accommodate the VSP survey. Given that the data obtained by VSP can be valuable in well management during production as well as during drilling, what is needed is a more effective manner of performing VSP.

Cost-effective hydrocarbon recovery also depends, in part, on drilling a wellbore quickly with minimal downtime. Because equipment failure is one frequent source of downtime, conventional BHA's are equipped with a number of sensors that measure various parameters relating to the operating status, health or condition of the components making up the BHA. For example, these sensor can measure: (a) borehole pressure and temperature; (b) drilling parameters, such as WOB, rotational speed of the drill bit and/or the drill string, and the drilling fluid flow rate; and (c) bottomhole assembly condition (parameters), such as mud motor differential pressure, torque, bit bounce and whirl etc. While these sensors can provide useful information regarding the condition of the BHA, conventional systems do not provide information regarding the equipment (e.g., drill string) uphole of the BHA or information regarding the wellbore and adjacent formation uphole of the BHA. In particular, information is not provided from distributed locations along an extended portion of the drill string. Conventionally, information is collected at only a localized point in the BHA, if at all.

This can be a drawback when models are used to assess the condition of the BHA and drill string and effectiveness of the drilling operation. These models can be simulation models for predicting BHA response to changes in drilling parameters or conditions. Information as to the drill string, wellbore, and formation at distributed or spaced-apart locations uphole of the BHA can improve the accuracy of such models. Thus, this information conventionally is estimated (e.g., based on a single measurement or information obtained hours or perhaps days earlier). In other arrangements, this information is simply omitted. The modeling used to assess the condition of the BHA and improve drilling operations would be more effective if this information was available and measured rather than estimated.

Further, conventional control systems and devices for controlling the drilling system utilize displays that convey information relating to drilling activity in numeric and/or alphanumeric format. These conventional techniques of displaying data visually disassociate the data from the component or location to which the data pertains. One drawback with such display formats is that it can be difficult for the driller to form an intuitive understanding of the overall physical condition of the drilling system. For example, it can be difficult for a driller to identify interrelationships between two or more measured physical conditions.

The present invention addresses these and other needs in the prior art.

SUMMARY OF THE INVENTION

In one aspect, the present invention provides a drilling system including a derrick erected on a floor and a drill string suspended therefrom. A bottomhole assembly (BHA) operatively coupled to an end of the drill string includes a drill bit and known components such as wellbore pressure control devices, thrusters, mud motors, steering units and other known components. The drilling system also can include control units, such as a surface control unit and a downhole control unit, that are programmed to perform any number of selected tasks; e.g., record and process data, control or assist in controlling drilling parameters and/or direction, and monitor drill string and BHA conditions. In one embodiment, the drill string includes sensors and devices that measure one or more selected parameters of interest from distributed locations along a section of a drill string. During construction of the well, these sensors provide measurements that can be used to improve drilling efficiency, enhance reliability of the various drilling system components, and increase the accuracy of directional drilling. During hydrocarbon production, the seismic data collected by the sensors can enhance the management and overall performance of the well.

In one arrangement, the distributed sensors are housed in one or more receiver subs that are disposed along the drill string in spaced-apart intervals. These sensors measure selected parameters of interest in real time or near-real time. Exemplary drill string sensors include sensors for measuring seismic energy, such as geophones, hydrophones, and accelerometers. Other suitable sensors include sensors for determining the operating condition of the drill string; e.g., physical quantities such as drill string acceleration and strain, internal pressures in the drill string bore, external pressure in the annulus, vibration, temperature, electrical and magnetic field intensities inside the drill string, etc. Exemplary sensors include temperature gages, strain gages, accelerometers, pressure transducers, magnetometers, electrical field strength sensors and other sensors known to one skilled in the art.

The receiver sub also can include a short-hop telemetry module, a processor module, and a clock module. The short-hop telemetry module includes a suitable transceiver for receiving and transmitting control/data signals. The drilling system can include repeater or relay subs for amplifying data or command signals being from the surface to the drilling assembly, or vice versa. The present invention, however, is not limited to any particular telemetry system. The processor module includes a memory in which data can be recorded and programmed instructions for processing or conditioning seismic and/or drill string parameter data. In an exemplary embodiment, sensor measurement data is time-stamped, pre-processed and stored in a memory module. The measurement data can be retrieved when the drill string is pulled out of the wellbore and/or transmitted in situ. Power to the sub is provided by a local source such as a battery (not shown) or a conductor (not shown) from the surface or drilling assembly. In another embodiment of a receiver sub, the sensors that measure seismic energy data are positioned on extensible members such as arms or pads that extend outward from the sub into physical contact or engagement with the wellbore wall. The receiver can also include a non-rotating sleeve that can freely rotate around the drill string and, therefore, allows the sensor(s) on the receiver to remain substantially rotationally stationary relative to the wellbore while the drill string is rotating.

In addition to the sensors distributed along the drill string, other sensors are positioned at the surface and in the bottom hole assembly. For example, the bottom hole assembly contains sensors for determining the physical health or condition of the BHA, directional sensors, formation and wellbore evaluation sensors, and sensors for determining the performance and wear condition of the drill bit. The system also measures drilling parameters or operations parameters and collects data relating to certain drilling assembly dysfunctions during drilling operations.

Thus, because the control unit(s) are provided with measurements from distributed locations instead of only at the BHA and surface, a more complete definition of the overall status of the drilling system is available. That is, these measurements can, partially or completely, replace estimated/localized values to thereby improve the output of the models for controlling drilling operations and geosteering. During an exemplary drilling operation, the surface control unit receives signals from the drill string sensors, BHA sensors, surface sensors (e.g., drilling fluid flow rate, hook load sensor) and any other sensors used in the system and processes such signals according to programmed instructions provided to the surface control unit. The downhole processor control unit and or surface unit can include one or more models, some of which may be dynamic models and simulation models.

In one aspect of operation, the downhole processors and the surface control unit process data relating to the various types of parameters noted above and utilize the models to determine or compute the drilling parameters for continued drilling that will provide an enhanced rate of penetration, extend drilling assembly life, provide more precise geosteering, and result in greater wellbore stability. In another aspect of operation, pressure and density measurements from the distributed sensors can be used to control pressure in the wellbore, including the bottomhole pressure, during drilling of the wellbore. Based on this information, the control unit operates suitable drilling fluid control devices to adjust the pressure and/or density profile such that a selected wellbore and/or bottomhole pressure is maintained at a selected condition (e.g., at-balanced, under-balanced, or over-balanced condition). In yet another aspect of operation, at least some of the distributed sensors are used to detect seismic energy generated by a seismic source (either at the surface, in the same well or in an offset well). Advantageously, in embodiments of the present invention, the distributed sensors can detect seismic energy in a number of operating scenarios: e.g., when the drill string is being rotated, when the drill string is not being rotated, when the drilling fluid is being circulated, when the drilling fluid is not being circulated, when the BHA and drill bit at bottom, and/or when the BHA and drill bit are off-bottom. The seismic sensors, which are strategically positioned in a distributed fashion along a specified span of the wellbore, collect seismic data that is "time stamped" with the downhole clock, processed and transmitted to the processors (surface control unit or a downhole processor). In one mode, the processed data is transmitted to an adjacent receiver (either upstream or downstream) for further processing and re-transmission. The data can also be stored in a memory module for later retrieval. The processors enter the seismic data into a model or database, which then is used for reservoir mapping and/or more accurate geosteering.

During the various modes of operation, the results of the computations performed by the processor are visually presented to the operator on one or more graphical user interfaces such as display panels (e.g., screens, displays, etc.). The graphical user interface provides the operator with a dynamically updated pictorial image representing the drilling system. In one embodiment, the image is constructed to show the constituent components of the drillings system and other locations (e.g., locations determined to be vulnerable to malfunctions) that are monitored with the distributed sensors. When the processor determines that the physical condition of a particular location or component is outside an established norm, the image is annotated with an appropriate visual signal such as by coding the location or component with a specified color. The processor can also display the results of analytical assessments of drilling efficiency and recommended actions for alleviating an unacceptable physical condition.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, reference should be made to the following detailed description of the preferred embodiment, taken in conjunction with the accompanying drawing.

DETAILED DESCRIPTION OF PREFERRED EMBODIMENTS

Figure 1:
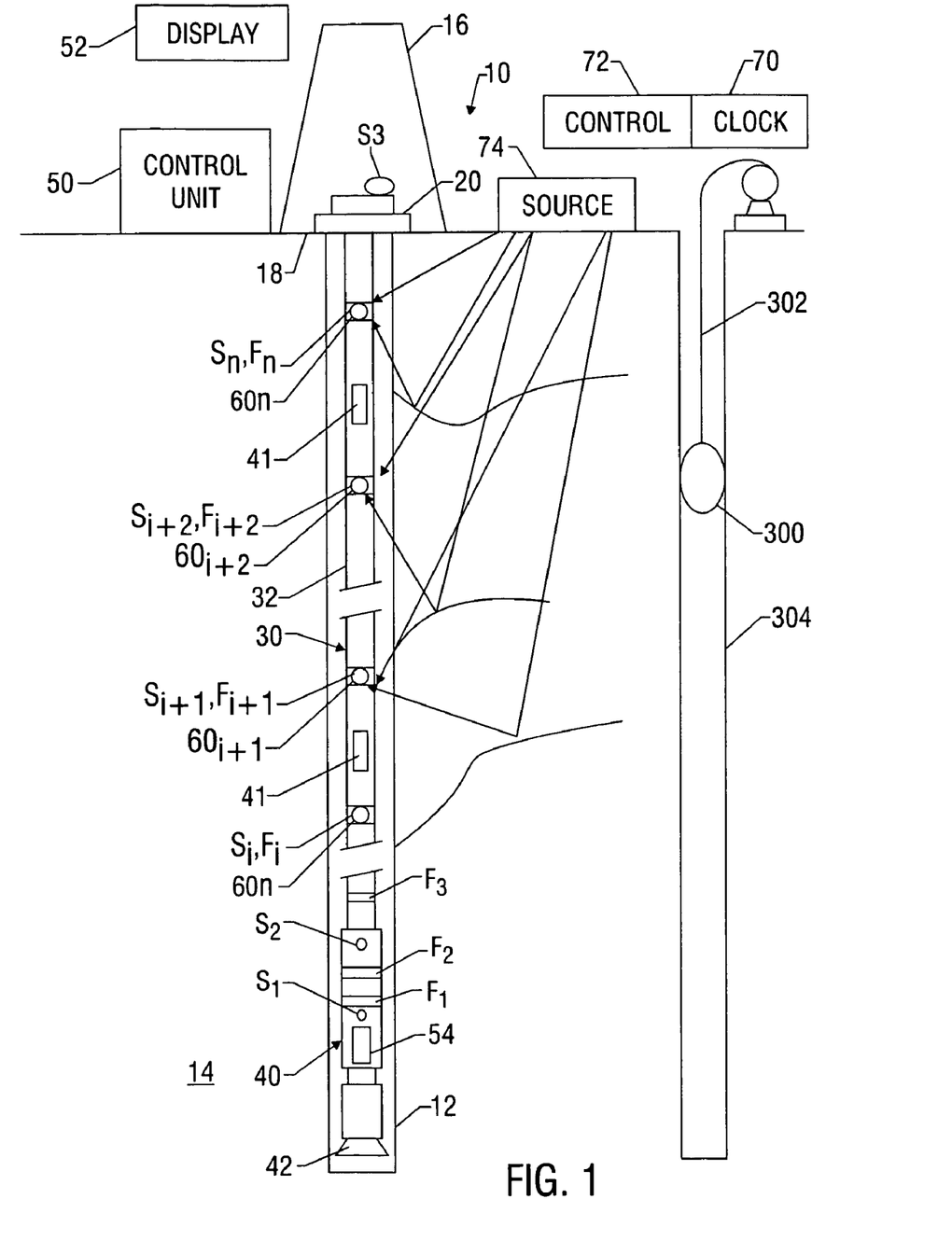
FIG. 1 is a schematic illustration of one embodiment of a drilling system made in accordance with the present invention.

Referring initially to FIG. 1, there is schematically illustrated a drilling system 10, which can be land-based or offshore, made according to one embodiment of the present invention for forming a wellbore 12 in a subterranean formation 14. The drilling system 10 includes a derrick 16 erected on a floor 18 that supports a rotary table 20 that is rotated by a prime mover. The system also includes a drill string 30 having a plurality of jointed tubulars 32 and a drilling assembly 40 coupled at an end thereof. The drilling assembly 40 is also referred to as a bottom hole assembly (BHA) 40. A control unit 50 controls drilling operations and a display device 52 provides the operator or driller information relating to drilling in pictorial, numeric, and alphanumeric formats. Other related components and equipment of the system 10 are well known in the art and is not described in detail herein. Also, it should be understood that applications other than rotary drives (e.g., coiled tubing applications) may utilize other equipment such as injectors.

The BHA 40 includes a drill bit 42 adapted to disintegrate a geological formation and known components such as thrusters, mud motors, steering units and other known components for forming a wellbore through the subterranean formation 14. Suitable drilling systems are disclosed in U.S. Pat. No. 6,512,606, which is herein incorporated by referenced, and which is commonly assigned. In one embodiment, control units, such as a surface control unit 50 and a downhole control unit 60, are programmed to perform any number of selected tasks; e.g., record and process data, assist the driller in controlling drilling equipment, control drilling operation in a closed-loop manner, and monitor drill string 30 and BHA 40 conditions. Additionally, the BHA 40 includes one or more devices (e.g., a pump) for controlling the pressure and/or flow rate of the drilling fluid. Suitable devices for controlling bottomhole pressure are discussed in U.S. patent application Ser. No. 10/251,138 filed Sep. 20, 2002, which is commonly assigned and is hereby incorporate by reference for all purposes. The drilling operator typically controls the surface-controlled drilling parameters, such as the weight on bit, drilling fluid flow through the drill pipe, the drill string rotational speed (RPM of the surface motor coupled to the drill pipe) and the density and viscosity of the drilling fluid to optimize the drilling operations.

As will be described below, the system 10 includes sensors $S_{1-n}$, $F_{1-n}$ distributed at least partially along the drill string 30, proximate to the BHA 30, and at the surface. The sensors $S_{1-n}$ are configured to measure, on a real-time or near-real time basis, parameters of interest relating to the physical health or condition of the drilling system (the drill string and BHA) and the formation. These sensors can be positioned at specified equipment within the system and also at selected locations $L_{1-n}$ that have been determined to be vulnerable locations. By vulnerable, it is meant that a particular location has been determined to be relatively more susceptible to failure, malfunction, or some other undesirable condition than other locations. The measurements provided by these sensors can be used to (i) improve drilling efficiency (e.g., increase rate of penetration); (ii) enhance reliability of the various components of the drilling assembly 40 and drill string 30; (iii) increase the effectiveness of steering or navigating through the subterranean formation (e.g., more precise steering toward a pay zone or precise determination of a pay zone); (iv) develop geological data for reservoir mapping; and (v) improve overall well performance during production.

In one embodiment, the jointed tubulars 32 (e.g., drill pipe or coiled tubing) forming the drill string 30 includes a plurality or array of seismic sensors configured to detect seismic energy imparted into the adjacent formation by a wellbore source 300 or surface source 74. The drill string 30 also includes sensors and other devices for measuring one or more parameters of interest in the vicinity of the drill string or relating to the drill string itself. While these sensors and devices will be referred to as "drill string sensors," it should be understood that such sensors are not limited to measuring parameters only relating to the drill string structure itself. Referring still to FIG. 1, there is schematically illustrated a drill string 30 provided with a plurality of receiver subs $60_{1-n}$ for housing one or more of the sensors $S_{1-n}$, $F_{1-n}$. The receiver subs $60_{1-n}$ are disposed along the drill string 30 in distributed, spaced-apart intervals.

Figure 2A:
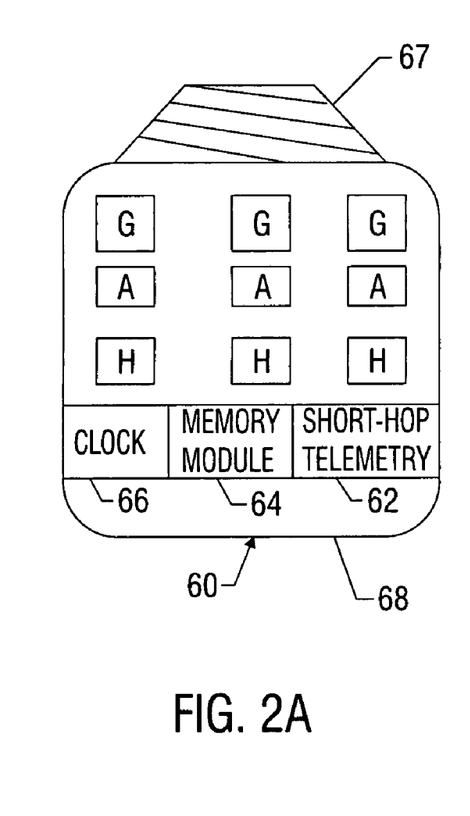
FIG. 2A schematically illustrates one embodiment of a receiver sub made in accordance with the present invention.

Referring now to FIG. 2A, there is shown one embodiment of a receiver sub 60 made in accordance with the present invention. One exemplary receiver sub 60 includes sensors for measuring seismic energy, such as geophones G, hydrophones H, and accelerometers A. The sensors are circumferentially distributed and measure seismic energy (e.g., motion, pressure pulses, etc.) along multi-axes (e.g., three axis). The sensor or transducer can be any device that converts acoustic energy into signals representative of the detected seismic energy. Exemplary sensors include, but are not limited to, geophones, hydrophones, one-axis accelerometers, and multi-axis accelerometers.

The receiver sub 60 can also include a short-hop telemetry module 62, a processor module 64, and a clock module 66. The short-hop telemetry module 62 includes a suitable transceiver (not shown) for receiving data signals and transmitting data signals. The short-hop telemetry module 62 is a component of a two-way telemetry system that can transmit signals (data and/or control) to the surface and/or to the BHA 40. In one arrangement, the telemetry module 62 is configured to transmit signals in an overneck fashion; e.g., telemetry module 62 of receiver sub $62_i$ can transmit to telemetry module 62 of receiver sub $62_{i-2}$, thereby bypassing receiver sub $62_{i-1}$. This may provide useful redundancy, for example, if the telemetry module of the receiver sub $62_{i-1}$ becomes inoperable. In an exemplary short-hop telemetry system, data is transmitted from one measurement point to an immediately adjacent measurement point, or a measurement point some distance away. The drilling system can include repeater or relay subs 41 for amplifying data or command signals being from the surface to the drilling assembly, or vice versa. Further, The repeaters 41 can include data processors for processing transmitted data.

The present invention, however, is not limited to any particular telemetry system. Any type or number of wellbore telemetry systems can be used in an exclusive, complementary or redundant fashion. For example, the present invention can utilize a mud pulse telemetry technique to communicate data from downhole sensors and devices during drilling operations. Other telemetry techniques, such as electrical signals via electrical conductors, optical signals via fiber optic bundles, electromagnetic and acoustic techniques, may be utilized for the purposes of this invention. U.S. Pat. No. 5,160,925, assigned to the assignee hereof, which is incorporated herein by reference, discloses a modular communication link placed in the drill string for receiving data from the various sensors and devices and transmitting such data upstream or downstream.

The processor module 64 includes a memory in which data can be recorded and programmed instructions for processing or conditioning seismic and/or drill string parameter data. The processor module can convert the analog signal transmitted by the sensors/transducers into digital signals for processing and re-transmission. The electric circuitry can include analog-to-digital converters coupled to input from each sensor. The processor module 64 further includes one or more buffers or memory for storing digitized signals transmitted from other devices. In an exemplary embodiment, sensor measurement data is time-stamped, pre-processed and stored in a memory module. The measurement data can be retrieved when the drill string is pulled out of the wellbore and/or transmitted in situ. The data of one sub 60$_i$ is transmitted to an adjacent sub such as sub $60_{i+1}$, and ultimately collected at a processing unit, which can be downhole 60 or at the surface 50. The clock 66 is synchronized with a surface clock 70 associated with a source control 72 for controlling a seismic source 74 such as a vibrator, explosive device, or a marine air gun. In one arrangement, the surface clock 70 and the downhole clock 66 are periodically synchronized using a synchronization signal transmitted from the surface via a suitable telemetry system. Power to the sub 60 is provided by a local source such as a battery (not shown) or a conductor (not shown) from the surface or drilling assembly 40.

The receiver sub 60 is formed as a modular element that can be coupled (e.g., threaded) onto an end of a tubular member making up the drill string. In one embodiment, the sub 60 is a cylindrical member provided with a pin end 67 and a box end 68. The sub 60 will be fabricated with materials and with dimensions compatible with the drill string, as will be understood by one skilled in the art.

Figure 2B:
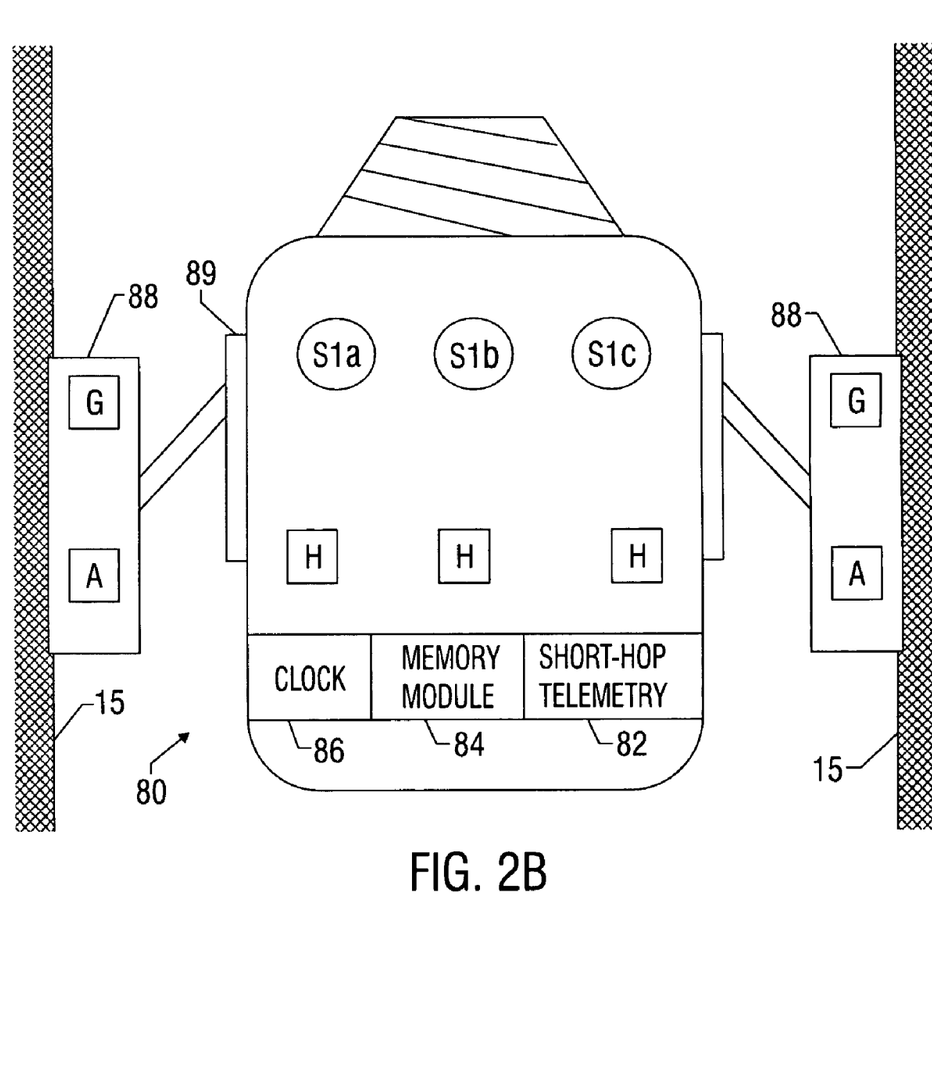
FIG. 2B schematically illustrates another embodiment of a receiver sub made in accordance with the present invention.

Referring now to FIG. 2B, there is shown another embodiment of a receiver sub 80 made in accordance with the present invention. An exemplary receiver sub 80 also includes sensors for measuring seismic energy (e.g., geophones G, hydrophones H, and accelerometers A), a short-hop telemetry system 82, a processor module 84, and a clock module 86. In the FIG. 2B embodiment, the sensors that measure data via an acoustical path, the geophone G and the accelerometer A, are positioned on arms or pads 88 that extend outward from the sub 80 into physical contact or engagement with a wellbore wall 15 such that the sensors (e.g., geophone G and/or accelerometer A) are acoustically coupled to the wellbore wall 15. The pads 88 can be biased either to a collapsed state or an extended state using a biasing member such as a spring. A suitable drive assembly (not shown) may used to move the pads 88. Exemplary embodiments of drive assemblies include an electromechanical system (e.g., an electric motor coupled to a mechanical linkage), a hydraulically-driven system (e.g., a piston-cylinder arrangement fed with pressurized fluid), or other suitable system for moving the pads 88 between the extended and retracted positions. In certain embodiments, the pads 88 are fixed to a non-rotating sleeve 89. The non-rotating sleeve 89 can substantially freely rotate relative to the drill string (not shown). Thus, the pad 88 extending from the non-rotating sleeve 89 is allowed to engage and remain substantially stationary relative to the wellbore wall 15 even when the drill string (not shown) is rotating. The sensor remains at the same azimuthal location relative to the wellbore as the drill string rotates. Of course, a certain amount of rotation of the non-rotating sleeve 89 may occur. In certain embodiments, the sensor can be positioned in the non-rotating sleeve 89 itself.

As will be appreciated, the above-described sensors provide seismic data from distributed locations along the well, with the measurements taking place in a substantially simultaneous fashion. This data can be advantageous applied to developing geological models after drilling that will assist in efficiently exploiting the hydrocarbon deposits residing in the formation. In one arrangement, this seismic data is also used in conjunction with other measured parameters during drilling to enhance equipment reliability and optimize drilling activity (e.g., navigation of a geological formation). These parameters and associated sensors and measurement devices are discussed hereinbelow.

Referring still to FIG. 2B, the receiver sub 80 can include sensors for determining selected parameters of interest relating to the operating condition of the drill string 30. For example, the sensors $S_i$ can measure, in real time or near-real time, physical quantities such as drill string acceleration and strain, internal pressures in the drill string bore, external pressure in the annulus, vibration, temperature, electrical and magnetic field intensities inside the drill string, bore of the drill string, etc. Exemplary sensors include temperature gages, strain gages, accelerometers, pressure transducers, magnetometers, electrical field strength sensors and other sensors known to one skilled in the art. The sensors $F_i$ can also include sensors for measuring one or more parameters of interest relating to the formation adjacent to the drill string 30. Exemplary parameters include resistivity, porosity, density and other known parameters. As will be discussed in further detail below, these measurements are obtained from distributed locations and, therefore, provide a more complete definition of the overall status of the drilling system and formation. Accordingly, these measurements can, partially or completely, replace estimated/localized values to thereby improve the output of the models for controlling drilling operations and geosteering. Moreover, the pressure/density measurements can be used to manage wellbore pressure to improve hole stability (e.g., reduce fracture and mudcake). Also, these measurements can be used to complete pressure/density profiles. In other embodiments, these drill string parameter sensors $S_i$ can be housed separately. Additionally, sensors such as pressure transducers and strain gages can, in certain embodiments, be integrated into the drill string (e.g., drill pipe or coiled tubing).

Referring now to FIG. 1, in addition to the sensors distributed along the tubulars making up the drill string 30, other sensors are strategically distributed in the bottom hole assembly 40. Exemplary parameters of interest measured by the sensors include: the operating condition of the drilling assembly (drilling assembly parameters), the position of the drill bit and the drilling direction (directional parameters), the borehole condition (borehole parameters), characteristics of the formations surrounding the drilling assembly (formation parameters), bed boundaries and other geophysical parameters (geophysical parameters), and the performance and wear condition of the drill bit (drill bit parameters). The system also measures drilling parameters or operations parameters, including drilling fluid flow rate, rotary speed of the drill string, mud motor and drill bit, and weight on bit or the thrust force on the bit.

Exemplary sensors include sensors for measuring the formation resistivity near and/or in front of the drill bit, a gamma ray device for measuring the formation gamma ray intensity and devices for determining the inclination and azimuth of the drill string. The inclinometer and gamma ray device are suitably placed along the resistivity measuring device for respectively determining the inclination of the portion of the drill string near the drill bit and the formation gamma ray intensity. In addition, an azimuth device (not shown), such as a magnetometer or a gyroscopic device, may be utilized to determine the drill string azimuth and logging-while-drilling devices for measuring formation porosity, permeability and density. For example, the present system can utilize a formation porosity measurement device, such as that disclosed in U.S. Pat. No. 5,144,126, which is hereby incorporated by reference for all purposes.

Other exemplary BHA sensors include a subassembly near the drill bit (referred to herein as the "downhole-dynamic-measurement" device or "DDM" device) containing a sufficient number of sensors and circuitry provides data relating to certain drilling assembly dysfunctions during drilling operations. The DDM device contains sensors, circuitry and processing software and algorithms for providing information about desired dynamic drilling parameters relating to the BHA. Such parameters can include bit bounce, stick-slip of the BHA, backward rotation, torque, shocks, BHA whirl, BHA buckling, borehole and annulus pressure anomalies and excessive acceleration or stress, and may include other parameters such as BHA and drill bit side forces, and drill motor and drill bit conditions and efficiencies. The DDM device processes the sensor signals to determine the relative value or severity of each such parameter and transmits such information to the surface control unit via a suitable telemetry system. The system also includes a simulation program that can simulate the effect on the drilling efficiency of changing any one or a combination of the drilling parameters from their current values. The DDM device as well as this simulation program, and associated hardware such as sensors, are discussed in U.S. Pat. No. 6,021,377, which is commonly assigned and hereby incorporated by reference for all purposes.

The surface control unit 50 receives signals from the drill string sensors, BHA sensors, surface sensors (e.g., hook load sensor) and any other sensors used in the system and processes such signals according to programmed instructions provided to the surface control unit 50. The surface control unit 50 displays desired drilling parameters and other information on a display/monitor 52 and is utilized by an operator to control the drilling operations. The surface control unit 50 contains a computer, memory for storing data, recorder for recording data and other peripherals. The surface control unit 50 also includes a simulation model and processes data according to programmed instructions and responds to user commands entered through a suitable device, such as a keyboard. The control unit 50 can be adapted to activate alarms when certain unsafe or undesirable operating conditions occur.

The downhole processor control unit 54 and or surface unit 50 include one or more models, some of which may be dynamic models. A dynamic model is one that is updated based on information obtained during drilling operations and which is then utilized in further drilling of the borehole. Additionally, the downhole processors 54 and the surface control unit 50 contain programmed instructions for manipulating various types of data and interacting with the models. The downhole processors 54 and the surface control unit 50 process data relating to the various types of parameters noted above and utilize the models to determine or compute the drilling parameters for continued drilling that will provide an enhanced rate of penetration and extended drilling assembly life. The system may be activated to activate downhole navigation devices to maintain drilling along a desired well path based on the measurements provided by sensors $S_i, F_i$.

Figure 3:
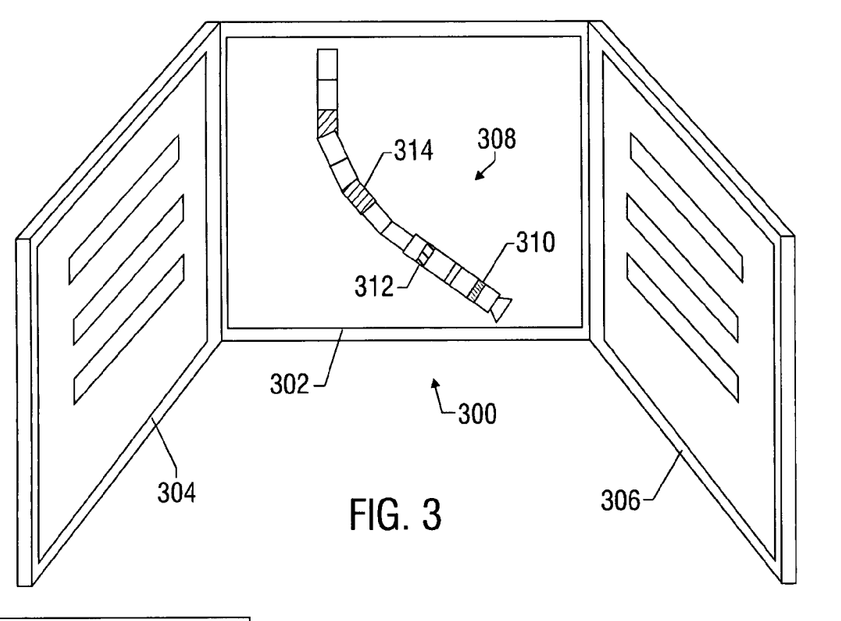
FIG. 3 schematically illustrates one embodiment of a display device made in accordance with the present invention.

Referring now to FIG. 3, there is shown one embodiment of a control station 300 adapted to monitor and direct drilling activity. The control station 300 can be in a trailer or other suitable facility at the wellsite or in a remote location. Via known communication and telemetry systems, the control station 300 provides the operator with a consolidated interface for receiving data relating to the drilling activity and for issuing appropriate command signals to control drilling. In one embodiment, the control station 300 includes one or more screens or panels 302,304,306 that provides the operator a pictorial representation of the physical condition of the drill string 30 (FIG. 1) (which includes the BHA 40). For example, in one arrangement a segment of the drill string 30 is visually replicated on the screen 302 such that the operator can readily recognize the location and/or equipment for which a given physical condition is identified and can assess the nature and magnitude of an unacceptable physical condition. In other arrangements, it may be feasible to replicate several segments of the drill string 30 or the entire drill string 30. It should be understood that the term "segment" merely signifies an arbitrary portion of the drill string 30 and does not denote any particular structural or functional boundaries.

The term "physical condition," in one aspect, relates to the degree to which a measured parameter of interest relating to the drill string varies from a pre-determined operating norm. This term, in another aspect, can also relate to observed system or equipment behavior or response as compared to predictive model.

In one embodiment, an image 308 of the drill string segment 30 is displayed on the screen 302. The image 308 can include some or all of the components and equipment making up the drill string segment 30 and also identify one or more vulnerable locations that may be susceptible to failure or malfunction. During use, the image 308 is annotated with visual signals that are indicative of a physical condition for the segment; e.g., the presence and degree of a dysfunction. In certain embodiments, the image 308 is shown in the same position and orientation as that of the drill string segment 30 in the wellbore and is refreshed to provide a real-time or near real-time status of physical conditions of the drill string segment 30 (i.e., the drill string and BHA). It should be appreciated that this visual presentation of information enables the operator to quickly institute corrective measures to remedy a system dysfunction or to allow the drilling system 100 to take such measures in a closed-loop fashion. It should be understood that a suitable image 308 need not be to scale or depict every component, sub-system, and equipment making up the drill string segment 30.

The coding or format for the visual signal enables the operator to determine whether the system is operating within predetermined norms and whether adjustments to operating parameters will improve performance. For instance, a location within the image 308 can be shown with no color to indicate operation within pre-determined range, with a first color 310 (e.g., yellow) for operation approaching the range limits and with a second color 312 (e.g., red) for operation outside of range limits. In certain embodiments, the visual signal can provide other information such as whether the given device is operating at below capacity. In such embodiments, a third color 314 (e.g., blue) can be used to identify a location or equipment operating at under-capacity. It should be understood that the visual signal is not limited to color, but can be any signal that can convey physical condition information to the driller (e.g., steady flashes and varied frequency of pulsed flashes). Moreover, the visual signal can be combined with other signals such as auditory signals. It should be appreciated that by coding or annotating the drilling assembly image 308 with indicators of physical condition, the operator observing the display 302 is given a global or "bird's eye" view of the overall health of the drill string 30. Furthermore, it should be appreciated that the image of the drill string can be annotated with two or more determined physical conditions and that the two or more determined physical conditions will be positioned on the image in approximately the same spatial positioning as on the actual drill string. Thus, the operator or driller is better positioned to ascertain the interrelationship between two or more determined physical conditions.

Figure 4:
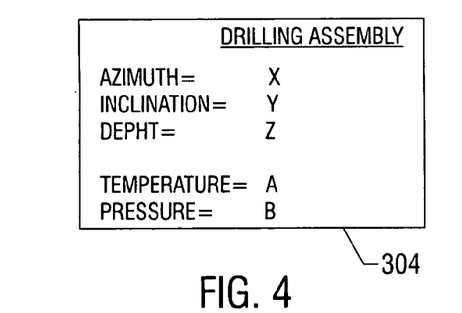
FIG. 4 schematically illustrates one embodiment of a display panel made in accordance with the present invention.
Figure 5:
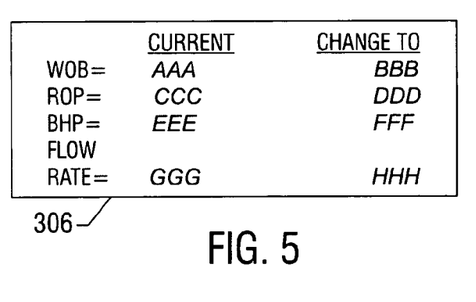
FIG. 5 schematically illustrates another embodiment of a display panel made in accordance with the present invention.

Referring now to FIGS. 3-5, the system can also display other information relating to drilling activity on the same panel or different panels. For instance, a second panel 304 can be provided to display drilling status information such as BHA orientation (e.g. azimuth, inclination, depth) and wellbore conditions (e.g., pressure and temperature). A third panel 306 can be provided to display the results of predictive analysis relating to drilling efficiency. For instance, the third panel 306 can display the current values of selected drilling parameters and the recommended values that one or more models predict will alleviate a given unacceptable physical condition and/or improve drilling efficiency. While the second and third panels 304, 306 are shown as displaying data in alpha-numeric format, this data can also be shown pictorially. For instance, a well bore trajectory displayed on the second panel 304 can be shaded with suitable colors to (with or without alphanumeric annotations) provide a graphical indication of the pressure or temperature gradient along the drilled wellbore. Such information can also be consolidated (e.g., superimposed) on drill string visually depicted on the first panel 302.

Figure 6:
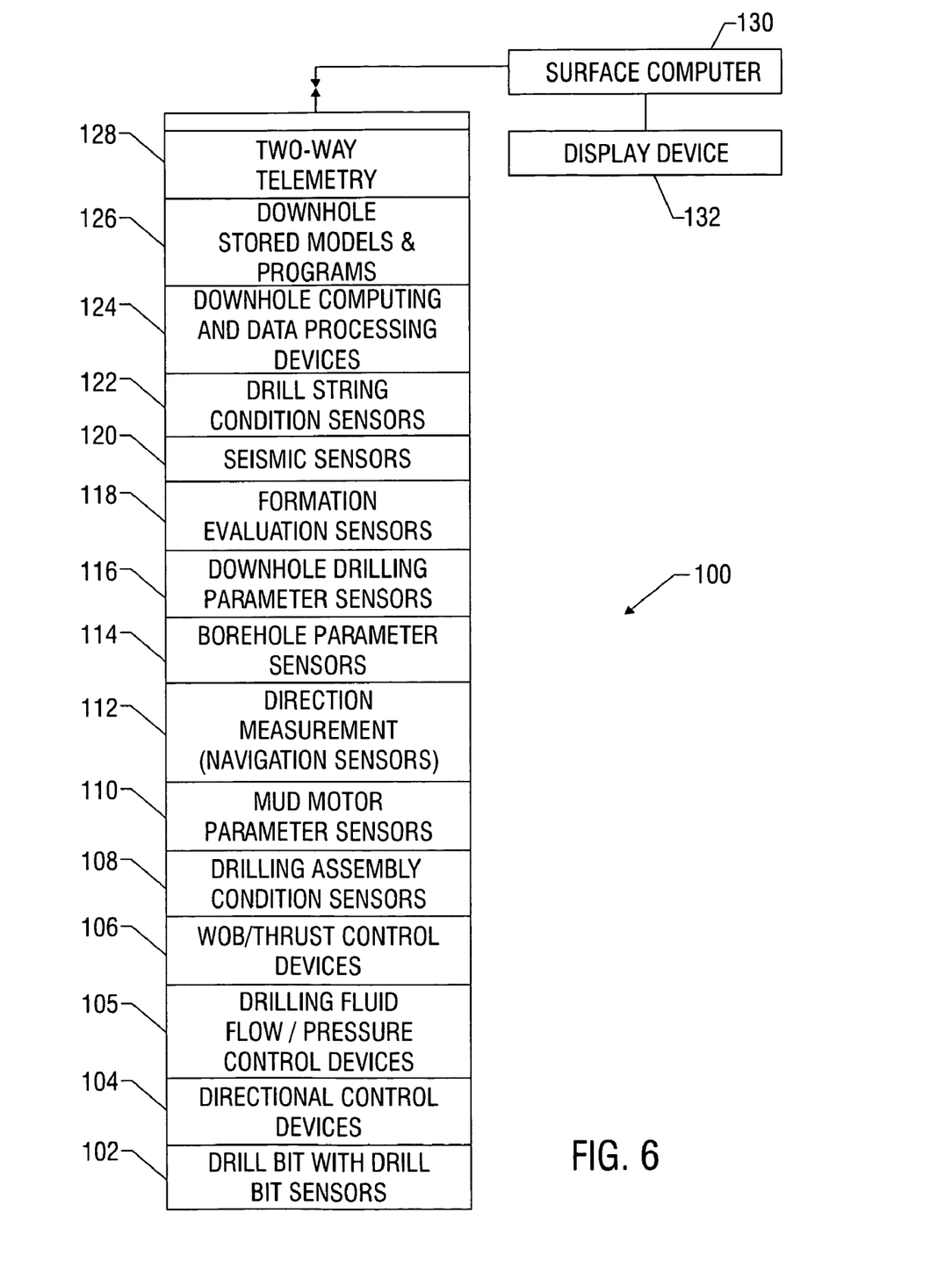
FIG. 6 shows a functional block diagram of the overall relationships of various types of parameters utilized in the drilling system of the present invention to effect optimal drilling operations.

Referring now to FIG. 6, an exemplary drilling system according to one embodiment of the present invention contains a bottom hole assembly (BHA) 100 and a drill bit 102. The BHA 100 further includes: direction control devices 104 and device 106 for controlling the weight on bit or the thrust force on the bit. The direction is controlled by controlling the direction control devices 104, which may include independently controlled stabilizers, downhole-actuated knuckle joint, bent housing, and a bit orientation device.

The BHA 100 also includes sensors for determining drilling assembly conditions during drilling (drilling assembly or tool parameters) 108, sensors for determining mud motor parameters 110, sensors for determining the BHA's position, direction, inclination and orientation (directional parameters) 112, and sensors for determining the borehole condition (borehole parameters; e.g., borehole temperature and pressure) 114. Drilling parameters, such as the weight on bit, rotational speed and the fluid flow rate are determined from the drilling parameter sensors 116. The nature and condition of the formation through which the borehole is being drilled is determined by formation evaluation sensors 118. The drill bit 102 has associated sensors for determining drill bit wear, drill bit effectiveness and the expected remaining life of the drill bit 102.

This exemplary embodiment of the drilling system also includes sensors 120 for measuring seismic energy during vertical seismic profiling and sensors 122 for determining the physical health or condition of the drill string. These sensors 120 and 122 are distributed along a specified span or length of the drill string associated with the BHA 100.

Additionally, the BHA 100 includes downhole circuits and computing devices 124 to process signals and data downhole for determining the various parameters associated with the drilling system 100 and causing downhole devices to take certain desired actions. One or more models and programmed instructions (programs) 126 are provided to the downhole processor 124 and/or surface processor 130. The models 126 can include a dynamically updated formation evaluation data base used to geosteer the BHA 100. Communications devices 128 provide two-way communication of data and signals between the BHA 100 and the surface. A surface control unit 130 includes a computer for receiving data from the BHA 100 and is programmed to take actions to perform automated drilling and communicating data and signals to the drilling assembly.

The BHA 100 and the surface control equipment 50,52 (FIG. 1) use information from the various sensors and the models to determine the drilling parameters that if used during further drilling will provide enhanced rates of penetration and extended tool life. Further, the measurements provided by the seismic sensors are periodically used to update the database used to navigate the BHA 100. In either case, the drilling system can be programmed to provide those values of the drilling parameters that are expected to optimize the drilling activity and continually adjust the drilling parameters within predetermined ranges to achieve such optimum drilling, without human intervention. The drilling system 100 can also be programmed to require any degree of human intervention to effect changes in the drilling parameters.

Figure 7:
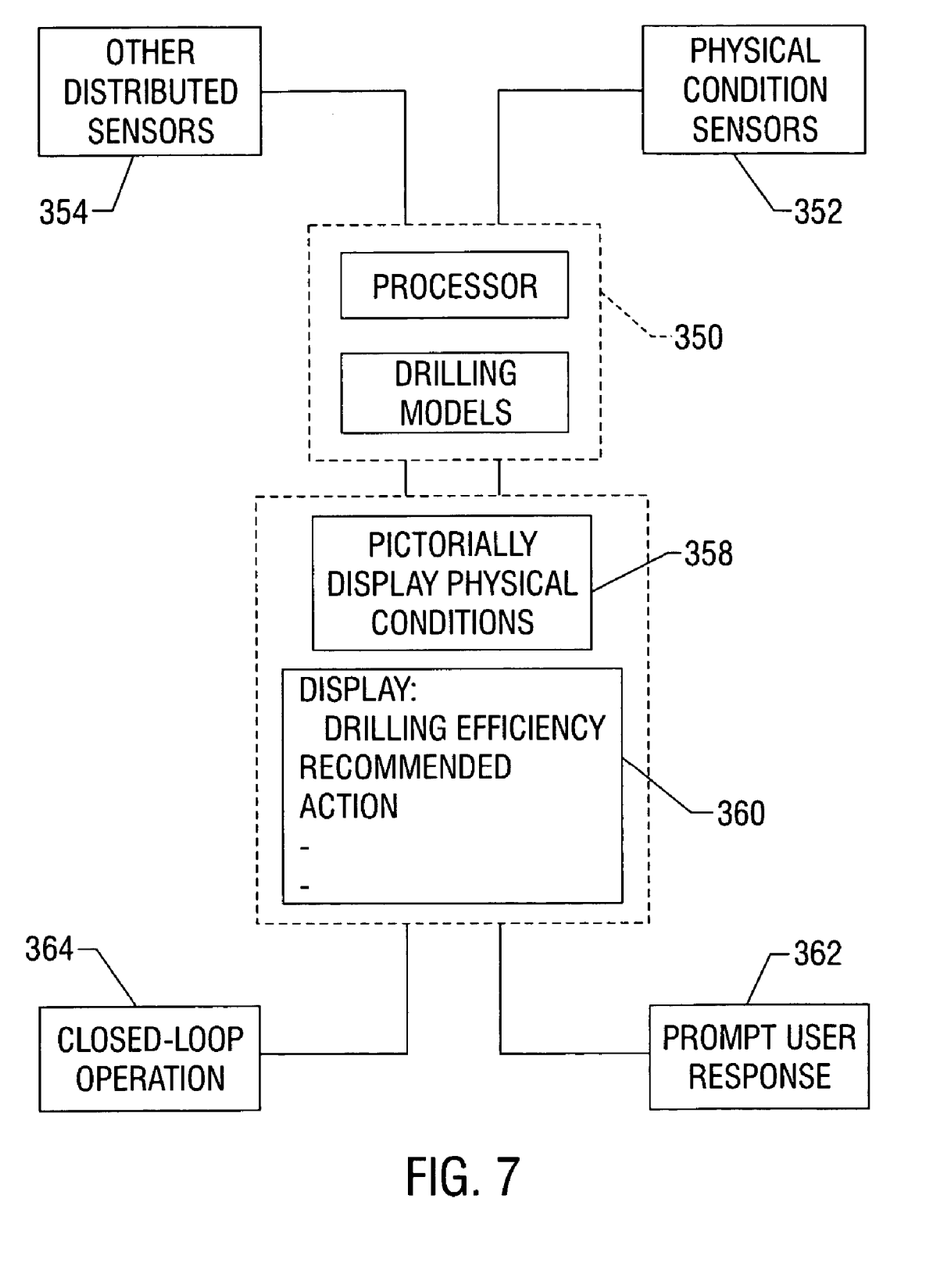
FIG. 7 illustrates a generic drilling assembly for use in one embodiment of the present invention.

Referring now to FIG. 7, there is shown the overall functional relationship of the various aspects of an exemplary drilling system (such as shown in FIGS. 1-7) described above. The system or the operator sets one or more drilling parameters to start the drilling. The operating range for each such parameter is predefined. As will be discussed below, the system uses a processor 350 to interactively or in a closed-loop fashion determine the physical condition of the drilling system and determine whether adjustments to the selected drilling parameter(s) will optimize drilling (e.g., increase ROP or tool life).

During operation, the processor 350 uses the measurements from physical condition sensors 352 distributed along the drilling system 100 to determine the physical health and operating efficiency of the drilling system 100. The distributed physical condition sensors include drill bit sensors, an rpm sensor, a weight on bit sensor, sensors for measuring mud motor parameters (e.g., mud motor stator temperature, differential pressure across a mud motor, and fluid flow rate through a mud motor), and sensors for measuring vibration, whirl, radial displacement, stick-slip, torque, shock, vibration, strain, stress, bending moment, bit bounce, axial thrust, friction and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc.

The processor 350 can also use measurements from other distributed sensors 354. These sensor include sensors for measuring BHA position parameters (e.g., BHA azimuth, BHA coordinates, BHA inclination and BHA direction), sensors for measuring a boundary location relative to the BHA, formation evaluation sensors (e.g., resistivity, dielectric constant, water saturation, porosity, density and permeability), sensors for measuring borehole parameters (e.g., borehole size, and borehole roughness), sensors for measuring geophysical parameters (e.g., acoustic velocity and acoustic travel time), sensors for measuring borehole fluid parameters (e.g., viscosity, density, clarity, rheology, pH level, and gas, oil and water contents), a boundary condition sensors, sensors for measuring physical and chemical properties of the borehole fluid, sensors for measuring drilling parameters (e.g., weight on bit, rate of penetration, drill bit r.p.m. and fluid flow rate), and pressure and temperature sensors.

The processor 350 is programmed to perform periodic or continuous diagnostics on the drilling system 100 by using the measurements from these distributed sensors 352,354. In one embodiment, the processor 350 uses pre-determined models relating to the operating norms for the drilling system and its constituent components. During drilling, the processor 350 utilizes these pre-determined models in conjunction with the data received from the distributed sensors 352,354 to assess the physical condition of drilling system and related components. In other embodiments, the processor 350 includes predictive models based on data accumulated from factory or lab testing, field testing, drilling in an offset well, other wells in the same field and the current well being drilled. Using these predictive models, the processor 350 determines the expected response of the drilling system 100 to changes in selected drilling parameters and recommends changes that are predicted to improve drilling operations. These computations are depicted in box 356. Thus, the processor 350 (downhole computer or combination of downhole and surface computers) utilizes the measurement values to determine the physical condition of the drilling system to determine whether drilling can be optimized (e.g., enhanced drilling rate, extended tool life, and/or more precise geosteering).

The results of the computations associated with these determinations are visually presented on a graphical user interface such as a display panel as shown in box 358. One or more graphical user interfaces (e.g., screens, displays, etc.) provide the operator with a dynamically updated image representing the drilling system. When the processor 350 determines that the physical condition of a particular location or component is outside an established norm, the image is annotated with an appropriate visual signal such as by coding the location or component with a specified color. As shown in box 360, the operator is also presented with the results of an analytical assessment of drilling efficiency and a recommended course of action for alleviating an unacceptable physical condition. The processor 350, in one embodiment, thereafter prompts the operator for action as shown in box 362.

In another arrangement, as shown in box 364, drilling activity is undertaken in a closed loop fashion. For example, the processor 100 can be programmed to transmit control signals that cause the control devices associated with the drilling parameters, such as the motors for rotational speed, drawworks or thrusters for WOB, fluid flow controllers for fluid flow rate, and directional devices in the drill string for drilling direction, to automatically change any number of such parameters. For example, the surface computer can be programmed to change one or more selected drilling parameters (e.g., fluid flow rate, weight on bit and rotational speed for rotary applications, thrust force, drilling direction, etc.). The changes described can continually be made automatically as the drilling condition change to improve the drilling efficiency. The system 100 may also be programmed to dynamically adjust any model or database as a function of the drilling operations being performed.

Merely by way of illustration, in one mode of operation, the processor 350 may determine that the measured loadings (e.g., stress, strain, torsion) on a specified vulnerable or critical location may lead to premature failure. This determination may be based on comparing the measured load values against pre-set norms and performing a failure mode analysis using measured temperatures at the specified location. Based on this determination, the processor 350 causes a corresponding point on the image 308 (FIG. 3) to be annotated with a visual indicator such as color such as red. This visual indication quickly conveys to the operator the presence, severity, and location of the condition dysfunction. Simultaneously or upon prompting, the processor 350 can display available corrective measures to remedy the dysfunction. In another situation, the processor 350 may determine that the drilling system 100 is operating within predetermined norms but that one or more components are under-utilized. The processor 350 may determine that the available capacity can be used to enhance the rate of penetration. These determinations can also be presented to the operator visually. For example, the processor 350 may identify the components that are under-utilized with a specified visual indicator such as the color blue and also display recommended adjustments to operating parameter to take advantage of this available capacity.

Referring now to FIGS. 1 and 6, in another aspect, pressure and density measurements from the distributed sensors $S_i$, $F_i$ can be used to control pressure in the wellbore, including the bottomhole pressure. In many instances, it is desirable that the hydrostatic pressure of the drilling fluid in the wellbore be above the formation or pore pressure to avoid well blow-out (i.e., an overbalanced condition). The bottomhole pressure is functionally related to the equivalent circulating density ("ECD") of the fluid at the wellbore bottom. This term, ECD, describes the condition that exists when the drilling mud in the well is circulated. The friction pressure caused by the fluid circulating through the open hole and the casing(s) on its way back to the surface, causes an increase in the pressure profile along this path that is different from the pressure profile when the well is in a static condition (i.e., not circulating). In addition to the increase in pressure while circulating, there is an additional increase in pressure while drilling due to the introduction of drill solids into the fluid. This negative effect of the increase in pressure along the annulus of the well is an increase of the pressure that can fracture the formation below the shoe of the last casing.

FIG. 7 shows the overall functional relationship between the seismic sensor measurements and the drilling system 100 described above. The sensors can measure seismic energy while the drilling system 100 is in any number of operating modes. For example, the BHA and drill bit can either off the well bottom (e.g., suspended, tripping into the wellbore or out of the wellbore) or at-well bottom (e.g., during drilling). Moreover, drilling fluid can either be circulated or not circulated. Further, the drill string can be rotating or not rotating. Thus, it should be appreciated that seismic measurements can be taken during drilling, while drilling has been temporarily halted, during tripped of the drill string and BHA into or out of the wellbore, or any other operating mode.

Referring now to FIGS. 1-8, in one exemplary mode of operation, drilling of the wellbore 12 is temporarily halted. Depending on the level of background noise, drilling mud circulation may have to be reduced or stopped. If the receiver subs $60_{1-n}$ include extensible pads 88, then the pads are extended into engagement with the wellbore wall (if not already in such a position). It should be appreciated that, at this point, a plurality of seismic sensors have been strategically distributed through a specified span of the wellbore 12. Thereafter, a surface seismic source 72 is used to generate seismic energy that radiates into the formation 14 penetrated by the wellbore 12. Typically, a check shot is performed to find the average interval velocity from the surface to the receiver subs 60. Next, the source produces seismic signals via an impulse, a sweep, combinations of impulses and/or sweeps, and/or other more complex variations. The seismic energy waves produced by the source are recorded by the sensors of the receiver subs $60_{1-n}$. Some of these waves travel directly to the receiver subs while other are waves reflected from discontinuities in the formation. It should be understood that in other applications, seismic data can be collected during drilling. Embodiments of receiver subs having non-rotating sleeves can be advantageously applied to such applications.

Figure 8:
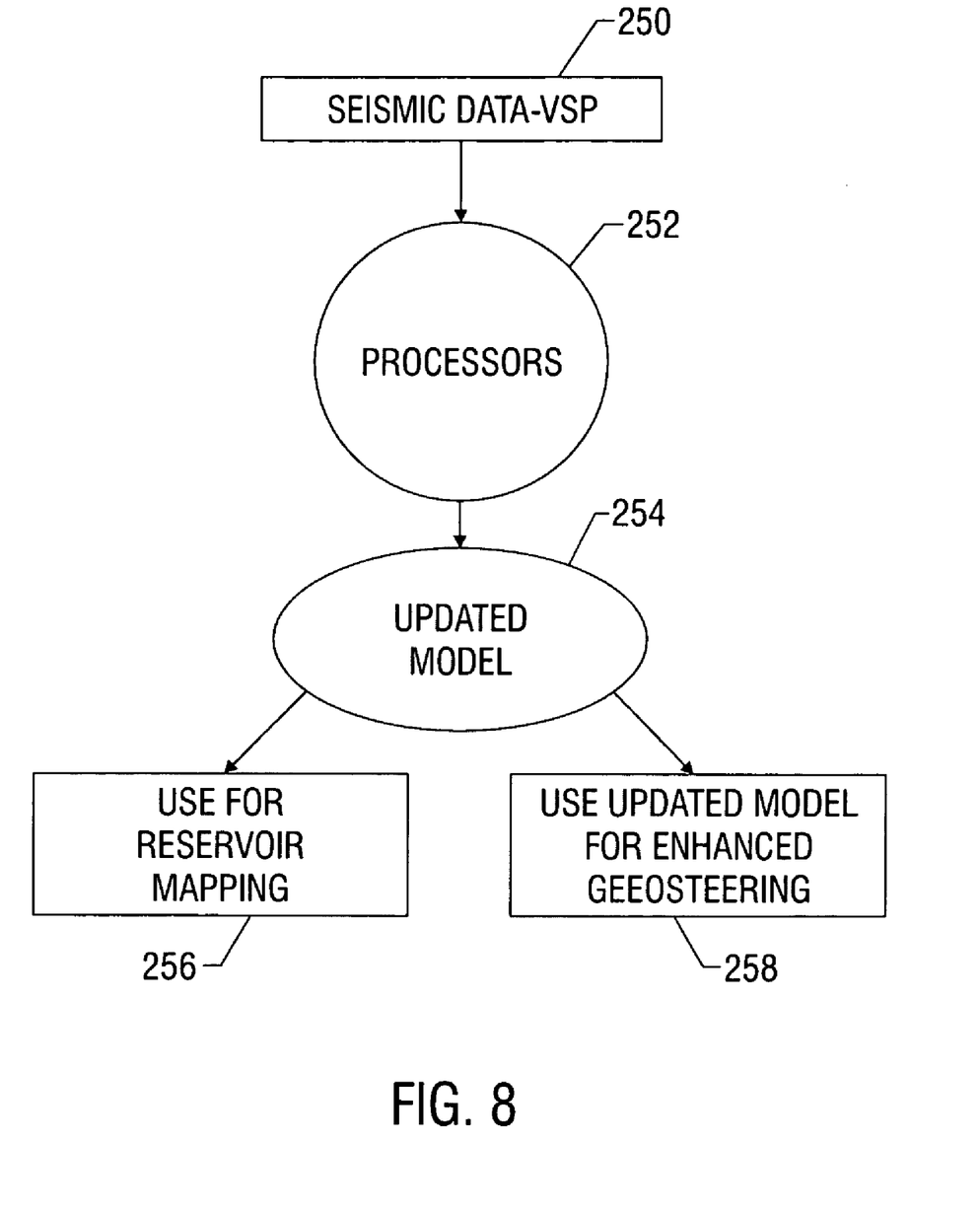
FIG. 8 shows an exemplary functional block diagram of the overall relationships of various types of parameters utilized to effect VSP.

The seismic data 250 collected by the receiver subs $60_{1-n}$ is "time stamped" with the downhole clock, processed and transmitted to the processors 252 (surface control unit or a downhole processor). The data 250 can also be stored in a memory module for later retrieval. The processors 252 enter the seismic data 250 into a model or database 254, which then is used for reservoir mapping 256 and/or more accurate geosteering 258.

Referring now to FIGS. 1 & 3, in a related mode of operation, a wellbore source 300 is suspended along a wire line or other umbilical 302 in an offset well 304. The source 300 can include one or more sonde or other devices that are configured to impart pressure pulses in the offset well 304. In certain embodiments, the source 300 is stationary. In other embodiments, the source 300 can move along the offset well 304 in a preset coordination with the seismic sensors inside the wellbore 12. In another related mode of operation, the source can be positioned in the wellbore 12 itself. For instance, the source can be attached at a selected location along the drill string 30 or positioned in the BHA 40. Also in certain embodiments, a combination of sources in these separate locations can also be used.

Pressure and density measurements from distributed sensors $S_i$ can be used to develop complete pressure and/or density profile for the wellbore 12. Based on this information, the surface computer and/or downhole computer 124 can operate suitable drilling fluid control devices 105 (e.g., a positive displacement pump or centrifugal pump in the wellbore or surface pumps) to adjust the pressure and/or density profile such that a selected wellbore and/or bottomhole pressure is maintained. For example, the pressure can be controlled to provide an at-balanced, under-balanced, or over-balanced condition. Also, the pressure can be maintained below the fracture pressure of the formation or controlled such that the amount of drilling fluid leeched into the formation is reduced. It will be seen that such control will provide a well bore 12 with a "cleaner" wellbore (e.g., reduced mud cake), fewer fractures, lower risk of well wash out, etc., such that the performance of the well during production will be enhanced (e.g., improved flow of hydrocarbons from the formation into the wellbore 12). The pressure and density measurements also have other uses such as locating portions of the wellbore having excessive cuttings.

From the above, it should be appreciated that the application of the teachings of the present invention can (either separately or in combination) can lead to safer, more efficient and more cost-effective hydrocarbon recovery. Exemplary advancements of conventional drilling systems include enhancing drilling rates and extended drilling assembly life, which can result in lower construction costs. Other advancements include enhanced well bore stability and improved hole quality, which can lead to longer well life and increased production rates.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of controlling the drilling of a wellbore using a drill string formed of jointed tubulars and having a bottomhole assembly (BHA) coupled to an end thereof, the method comprising:

providing a plurality of distributed sensors along at least a portion of the jointed tubulars and at the BHA, the distributed sensors being configured to measure one or more selected parameters of interest;

measuring the selected parameters of interest;

transmitting the measurements to a processor;

processing the measurements using the processor to determine a physical condition for a selected segment of the drill string;

providing a display device for pictorially representing an image of the selected segment of the drill string; and indicating the determined physical condition for the selected segment of the drill string by providing a visual signal on the image.

2. The method according to claim 1 wherein at least one of said distributed sensors is associated with a vulnerable location on the drill string.

3. The method according to claim 1 wherein the visual signal identifies an unacceptable determined physical condition.

4. The method of claim 1 wherein the visual signal includes a selected color.

5. The method of claim 1 wherein the visual signal includes a signal identifying the degree to which the determined physical condition varies from a predetermined norm.

6. The method according to claim 1 further comprising determining an adjustment to a selected drilling parameter if one or more of the determined physical conditions is outside of a predetermined norm; and displaying the adjustment on the display device.

7. The method according to claim 6 wherein the drilling parameter is selected from a group consisting of weight-on-bit, fluid flow rate, drilling fluid viscosity, drilling fluid density, and drill bit rotational speed.

8. The method according to claim 1 wherein the processor determines the physical conditions for a plurality of selected drill string segments; the display device pictorially represents images of the plurality of selected drill string segments; and the determined physical conditions for the plurality of selected drill string segments are indicated by visual signals on the images.

9. The method according to claim 1 wherein the processor has an associated model, the processor cooperating with the model and utilizing the measurements from the plurality of distributed sensors to compute a combination of drilling parameters that when used for further drilling of the wellbore will yield at least one of (i) enhanced drilling rate, (ii) extended drilling assembly life, (iii) enhanced wellbore stability, (iv) improved hole quality, and (v) cause an unacceptable measured physical condition to return to within a predetermined norm; and further comprising using the processor to cause the drilling system to alter the drilling parameters to the computed values for further drilling of the well bore.

10. The method according to claim 1, wherein at least one of the distributed sensors measures a downhole parameter selected from the group comprising bit bounce, torque, shock, vibration, rotation, stick-slip, whirl, bending moment, and drill bit condition.

11. The method according to claim 1, wherein at least one of the distributed sensors is selected from the group comprising pressure sensor, accelerometer, magnetometer, gyroscopes, temperature sensor, force on bit sensors, and drill bit wear sensor.

12. The method according to claim 1 wherein at least one of the distributed sensors measures one of (i) pressure; and (ii) density of a drilling fluid in the wellbore; and further comprising: determining one of: (i) a pressure profile, and (ii) a density profile using the measured drill string parameter; and adjusting one of (i) a pressure, (ii) flow rate, and (iii) density of the drilling fluid to control the equivalent circulating density of the drilling fluid.

13. A system for drilling a wellbore, comprising:
a drill string, said drill string including a plurality of jointed tubulars and a bottomhole assembly (BHA) coupled to an end thereof;
a plurality of sensors distributed along at least a portion of said drill string, the distributed sensors being configured to measure one or more selected parameters of interest;
a processor receiving the measurements from said plurality of distributed sensors, determining a physical condition for a segment of said drill string using at least some of the measurements, and generating a pictorial image of said segment of said drill string; and
a display device for pictorially representing the image of said segment of said drill string, said image including a visual signal indicating the determined physical condition for said segment.

14. The system according to claim 13 wherein said sensors are positioned at one or more vulnerable locations on said drill string.

15. The system according to claim 13 wherein said visual signal identifies an unacceptable determined physical condition.

16. The system according to claim 13 wherein said visual signal includes a selected color.

17. The system according to claim 13 wherein said visual signal includes a signal identifying the degree to which said determined physical condition varies from a predetermined norm.

18. The system according to claim 13 wherein said processor determines an adjustment to a selected drilling parameter if said determined physical condition is outside of a predetermined norm; and said display device displays said determined adjustment.

19. The system according to claim 18 wherein said drilling parameter is selected from group consisting of weight-on-bit, fluid flow rate, drilling fluid viscosity, drilling fluid density, and drill bit rotational speed.

20. The system according to claim 13 wherein said processor determines physical conditions for a plurality of drill string segments; and said display device pictorially represents images of said plurality of drill string segments, said images including visual signals indicating the determined physical conditions for said plurality of drill string segments.

21. The system according to claim 13 wherein said processor has an associated model, said processor cooperating with said model and utilizing the measurements from said plurality of distributed sensors to compute a combination of drilling parameters that when used for further drilling of the wellbore will yield at least one of (i) enhanced drilling rate, (ii) extended drilling assembly life, (iii) enhanced wellbore stability, (iv) improved hole quality, and (v) causes an unacceptable determined physical condition to return to within a predetermined norm; and wherein said processor alters the drilling parameters to the computed values for further drilling of the wellbore.

22. The system according to claim 13, wherein said parameters of interest are selected from one of: bit bounce, torque, shock, vibration, rotation, stick-slip, whirl, bending moment, and drill bit condition.

23. The system according to claim 13, wherein at least one of said distributed sensors is selected from the group consisting of: pressure sensor, accelerometer, magnetometer, gyroscopes, temperature sensor, force on bit sensors, and drill bit wear sensor.

24. The system according to claim 13 wherein at least one of said distributed sensors measures one of (i) pressure; and (ii) density of a drilling fluid in the wellbore; and wherein said processor determines one of: (i) a pressure profile, and (ii) a density profile using said selected measured parameter of interest.

* * * * *